United States Patent
Ono et al.

(10) Patent No.: US 9,712,827 B2
(45) Date of Patent: Jul. 18, 2017

(54) FRAME RATE CONTROL METHOD AND APPARATUS FOR ENCODING IMAGE BASED ON THRESHOLD VALUE

(71) Applicant: NIPPON TELEGRAPH AND TELEPHONE CORPORATION, Toyko (JP)

(72) Inventors: Naoki Ono, Yokosuka (JP); Atsushi Shimizu, Yokosuka (JP); Ken Nakamura, Yokosuka (JP); Masaki Kitahara, Yokosuka (JP); Seisuke Kyochi, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 45 days.

(21) Appl. No.: 14/365,892

(22) PCT Filed: Jan. 21, 2013

(86) PCT No.: PCT/JP2013/051072
§ 371 (c)(1),
(2) Date: Jun. 16, 2014

(87) PCT Pub. No.: WO2013/111701
PCT Pub. Date: Aug. 1, 2013

(65) Prior Publication Data
US 2014/0341279 A1    Nov. 20, 2014

(30) Foreign Application Priority Data

Jan. 26, 2012 (JP) ................................. 2012-013773

(51) Int. Cl.
*H04N 19/172* (2014.01)
*H04N 19/132* (2014.01)
(Continued)

(52) U.S. Cl.
CPC ......... *H04N 19/172* (2014.11); *H04N 19/132* (2014.11); *H04N 19/146* (2014.11); *H04N 19/156* (2014.11); *H04N 19/587* (2014.11)

(58) Field of Classification Search
CPC .................................................... H04N 19/172
See application file for complete search history.

(56) References Cited

U.S. PATENT DOCUMENTS 5,619,281 A * 4/1997 Jung ...................... H04N 19/56
  348/699
6,031,584 A * 2/2000 Gray ...................... G06T 9/004
  375/240.28

(Continued)

FOREIGN PATENT DOCUMENTS

CN  101072339 A   11/2007
CN  101217657 A   7/2008

(Continued)

OTHER PUBLICATIONS

Extended European Search Report, Patent Application No. 13740874.6, May 4, 2015.

(Continued)

Primary Examiner — Jay Patel
Assistant Examiner — Irfan Habib
(74) Attorney, Agent, or Firm — Harness, Dickey & Pierce, P.L.C.

(57) ABSTRACT

An object is to suppress an instantaneous increase in the computational complexity of an encoder and an information amount of an encoding result without increasing a delay even when input timing of input video is not constant and fluctuates. A frame rate control method for adjusting a frame rate of input video to a frame rate at which an encoder is able to perform encoding includes: a step of determining whether the number of pictures input in the past within a predetermined time from a time when a determination target picture (Continued)

of dropping is input exceeds a predetermined threshold value; and a step of discarding the determination target picture if the number of pictures exceeds the threshold value and designating the determination target picture as an encoding target if the number of pictures does not exceed the threshold value.

3 Claims, 7 Drawing Sheets

(51) Int. Cl.
*H04N 19/146* (2014.01)
*H04N 19/156* (2014.01)
*H04N 19/587* (2014.01)

(56) References Cited

U.S. PATENT DOCUMENTS

| | | | | |
|---|---|---|---|---|
| 6,212,232 B1* | 4/2001 | Reed | H04N 19/172 | 348/419.1 |
| 6,356,309 B1* | 3/2002 | Masaki | G06T 9/005 | 348/439.1 |
| 6,546,140 B1* | 4/2003 | Hiranaka | H04N 19/172 | 375/E7.132 |
| 6,633,609 B1* | 10/2003 | Ing | H04N 19/176 | 375/240.02 |
| 6,751,405 B1* | 6/2004 | Hasegawa | H04N 9/8042 | 375/240.16 |
| 6,937,653 B2* | 8/2005 | Song | H04N 19/197 | 375/240.03 |
| 7,068,718 B2* | 6/2006 | Kim | H04N 19/147 | 375/240.02 |
| 7,079,581 B2* | 7/2006 | Noh | H04N 19/87 | 375/240.16 |
| 7,365,795 B2* | 4/2008 | Chen | H04N 7/012 | 348/452 |
| 7,826,529 B2* | 11/2010 | Lee | H04N 19/139 | 375/240.03 |
| 7,970,055 B2 | 6/2011 | Koto | | |
| 8,054,880 B2* | 11/2011 | Yu | H04N 21/23406 | 375/240.03 |
| 8,094,725 B2* | 1/2012 | Nakahara | H04N 19/159 | 375/240.13 |
| 8,396,118 B2* | 3/2013 | Auyeung | H04N 19/147 | 375/240.01 |
| 8,542,733 B2* | 9/2013 | Boyce | H04N 19/159 | 375/240.02 |
| 8,559,503 B2* | 10/2013 | Satou | H04N 19/172 | 375/240.03 |
| 8,886,017 B2* | 11/2014 | Kosaka | G06T 3/4038 | 386/224 |
| 8,902,995 B2* | 12/2014 | Raveendran | H04H 20/42 | 375/240.27 |
| 2002/0118756 A1* | 8/2002 | Nakamura | H04N 19/61 | 375/240.17 |
| 2004/0091045 A1* | 5/2004 | Chang | H04N 19/14 | 375/240.03 |
| 2004/0208201 A1* | 10/2004 | Otake | H04N 5/04 | 370/503 |
| 2005/0036698 A1* | 2/2005 | Beom | H04N 19/197 | 382/239 |
| 2005/0058197 A1* | 3/2005 | Lu | H04N 19/40 | 375/240.03 |
| 2005/0254579 A1* | 11/2005 | Kondo | H04N 19/197 | 375/240.03 |
| 2006/0104366 A1* | 5/2006 | Huang | H04N 19/147 | 375/240.27 |
| 2006/0285831 A1* | 12/2006 | Tanaka | H04N 5/232 | 386/233 |
| 2008/0112483 A1 | 5/2008 | Lu et al. | | |
| 2008/0151998 A1* | 6/2008 | He | H04N 19/147 | 375/240.03 |
| 2009/0103609 A1* | 4/2009 | Jiang | H04N 19/152 | 375/240.03 |

FOREIGN PATENT DOCUMENTS

| | | |
|---|---|---|
| JP | 63-191488 A | 8/1988 |
| JP | 2002-125226 A | 4/2002 |
| JP | 2005-328487 A | 11/2005 |
| RU | 2 377 737 C2 | 12/2009 |
| WO | 2008/129648 A1 | 10/2008 |

OTHER PUBLICATIONS

International Search Report (in Japanese with English Translation) for PCT/JP2013/051072, mailed Apr. 23, 2013; ISA/JP.

Decision on Grant, Russian Patent Application No. 2014129008, Jan. 14, 2016.

Notice of Allowance, Korean Patent Application No. 10-2014-7017401, Jun. 27, 2016.

Office Action in the parallel application CN 201380005516.9, mailed Mar. 2, 2017, with partial English translation of Search Report thereof.

* cited by examiner

FRAME RATE CONTROL METHOD AND APPARATUS FOR ENCODING IMAGE BASED ON THRESHOLD VALUE

CROSS-REFERENCE TO RELATED APPLICATIONS

This application is a U.S. National Phase Application under 35 U.S.C. 371 of International Application No. PCT/JP2013/051072 filed on Jan. 21, 2013 and published in Japanese as WO 2013/111701 A1 on Aug. 1, 2013. This application is based on Japanese Patent Application No. 2012-013773 filed Jan. 26, 2012. The contents of the above applications are incorporated herein by reference in their entirety.

TECHNICAL FIELD

The present invention relates to frame rate control in video coding, and more particularly to a frame rate control method, a frame rate control apparatus, and a frame rate control program which control the computational complexity and an information amount in an encoder.

BACKGROUND ART

Conventionally, when a frame rate at which encoding is possible is different from a frame rate of video input from an imaging device or the like to an encoder, technology which performs conversion into the frame rate at which the encoding is possible by performing a process of dropping the input video is used (see Patent Document 1).

Figure 5:
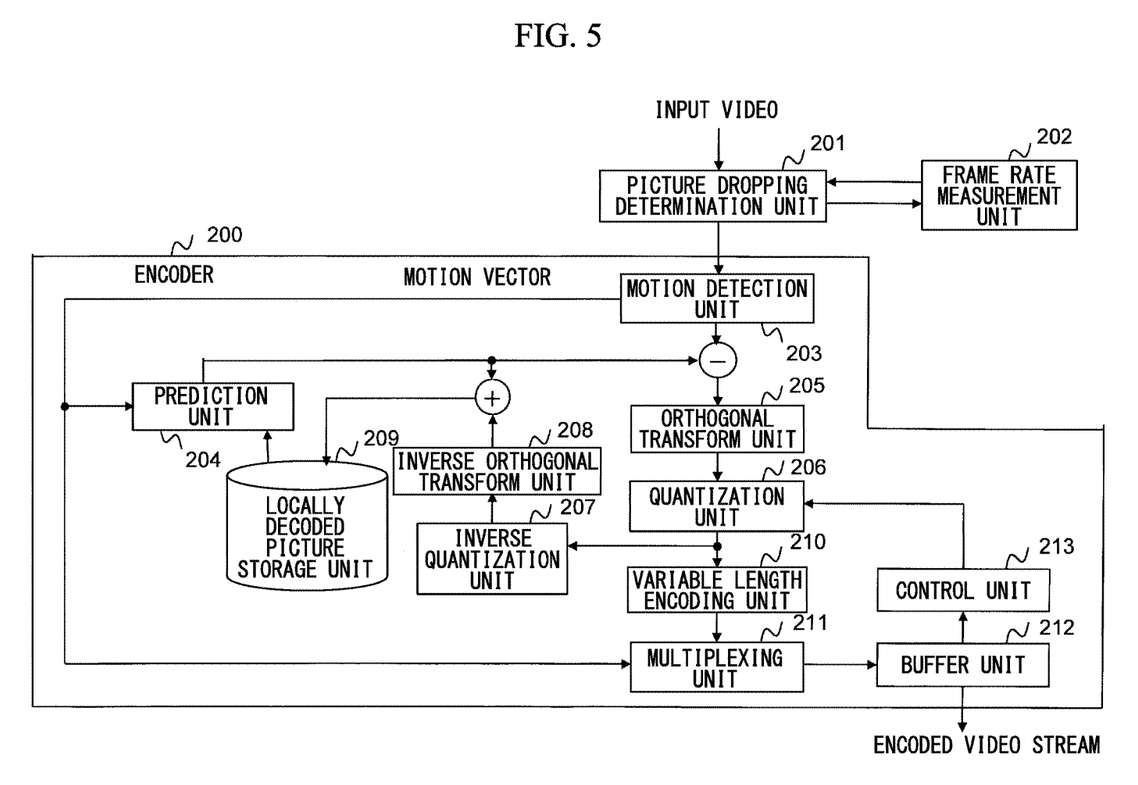
FIG. 5 is a block diagram illustrating a configuration of an apparatus in accordance with a conventional technology.
Figure 6:
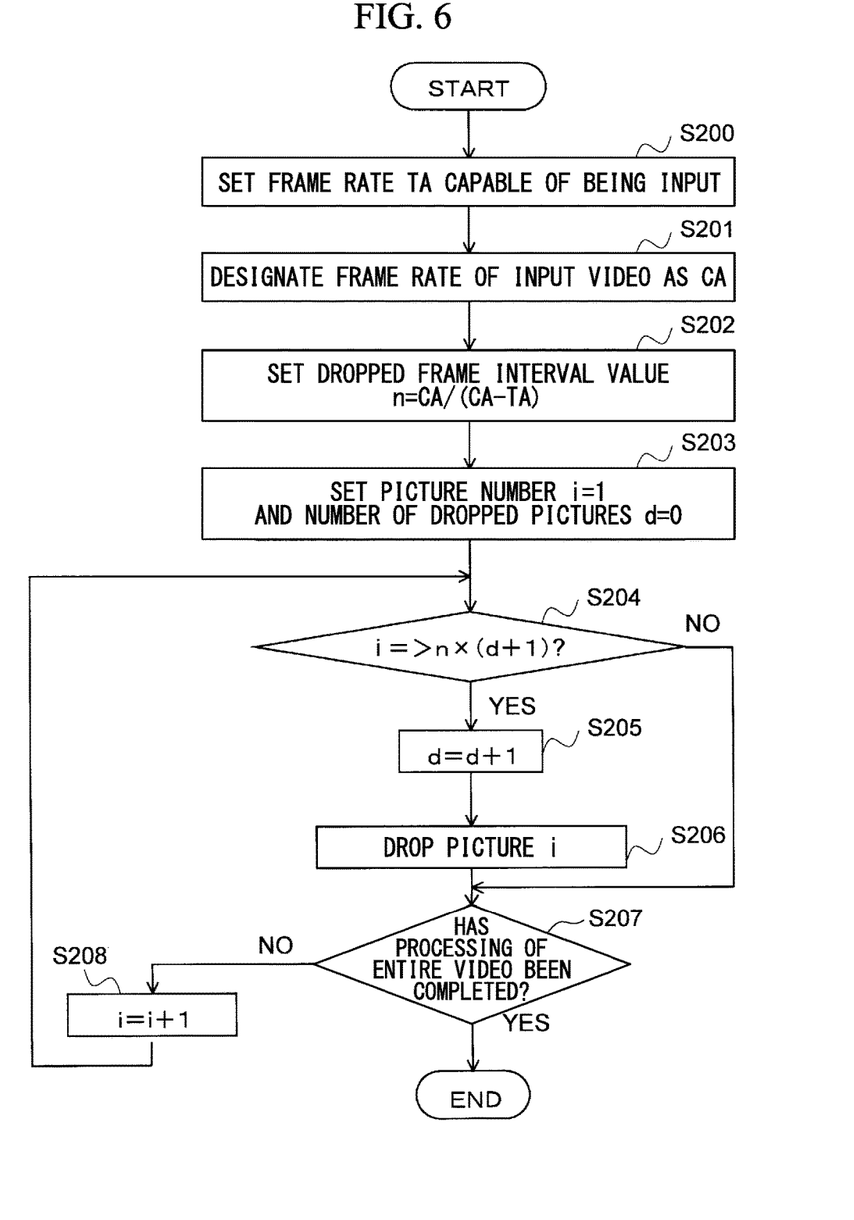
FIG. 6 is a flowchart of a picture dropping determination unit in the conventional technology.

FIG. 5 illustrates a block diagram illustrating a configuration of an apparatus in accordance with the conventional technology. FIG. 6 illustrates a flowchart of a picture dropping determination unit in the conventional technology.

In FIG. 5, an encoder 200 is, for example, an apparatus which encodes input video in accordance with an encoding scheme of H.264 or the like and outputs an encoded video stream. The encoder 200 is provided with: a motion detection unit 203 which performs motion detection for each of blocks obtained by dividing a frame; a prediction unit 204 which performs prediction using a motion vector detected by the motion detection unit 203; an orthogonal transform unit 205 which performs an orthogonal transform on a residual signal between an input signal and a predicted signal in accordance with a discrete cosine transform (DCT) or the like; a quantization unit 206 which quantizes transform coefficients; an inverse quantization unit 207 which inversely quantizes a quantized result; an inverse orthogonal transform unit 208 which performs an inverse orthogonal transform on transform coefficients; a locally decoded picture storage unit 209 which stores a locally decoded picture obtained by adding the predicted signal to an output of the inverse orthogonal transform unit 208; a variable length encoding unit 210 which performs variable length encoding on an output of the quantization unit 206; a multiplexing unit 211 which multiplexes encoding information; a buffer unit 212 which stores encoded information and outputs it as the encoded video stream; and a control unit 213 which performs encoding control on the quantization unit 206 and the other units in accordance with a generated bit amount or the like.

When a frame rate at which encoding by the encoder 200 is possible is different from a frame rate of the video input from an imaging device or the like to the encoder 200 measured by a frame rate measurement unit 202, a picture dropping determination unit 201 performs conversion into the frame rate at which the encoding is possible by performing a process of dropping the input video. The frame rate measurement unit 202 measures the frame rate of the input video and notifies the picture dropping determination unit 201 of the frame rate.

The picture dropping determination unit 201 executes the process illustrated in FIG. 6. First, the encoder 200 sets a frame rate TA capable of being input (step S200), designates the frame rate of the input video as CA (step S201), and calculates a dropped frame interval value n=CA/(CA−TA) from CA (step S202). Next, a picture number i is initially set to 1 and the number of dropped pictures d is initially set to 0 (step S203), and the following process is performed.

A determination as to whether a picture i is to be dropped is made based on whether the picture number i of a determination target picture exceeds a value obtained by multiplying n by the number of dropped pictures d so far. That is, a determination as to whether i≥n×(d+1) is made, and steps S205 and S206 are executed if i is greater than or equal to n×(d+1). In step S205, 1 is added to d; in step S206, the picture i is dropped. If i is less than n×(d+1), the picture i is not dropped. Until processing of the entire video is completed (YES in step S207), the above steps S204 to S207 are iterated while 1 is added to i (step S208).

As described above, in the conventional technology, the number of dropped pictures which represents the number of pictures of the video from which one picture is dropped is calculated from a ratio between an input frame rate for the encoder and the frame rate at which the encoding is possible, and a process of dropping the input video is performed in accordance with the calculated number of dropped pictures.

In order to apply the present technology, the input frame rate CA for the encoder must be known in advance. Thus, it is necessary to measure the frame rate CA of the input video for the encoder using, for example, the frame rate measurement unit 202 illustrated in FIG. 5. However, for example, when the input timing of the input video fluctuates, the frame rate at the time of the measurement may not always be maintained. Thus, a situation in which many pictures are unnecessarily dropped or a situation in which the number of times of dropping is insufficient occurs.

PRIOR ART DOCUMENT

Patent Document

Patent Document 1: Japanese Unexamined Patent Application, First Publication No. 2005-328487

SUMMARY OF INVENTION

Problems to be Solved by the Invention

However, in an application for video communication such as a videophone, it is assumed that video is input using a Web camera or the like connected to a personal computer (PC) and encoded by a software encoder and an encoded video stream is transmitted to a reception end. In this case, timing when the video captured by the camera is input to the encoder may not be constant and may fluctuate due to, for example, a lack of resources of a central processing unit (CPU). In such a case, an input frame rate per unit time may be intermittently high.

Figure 7:
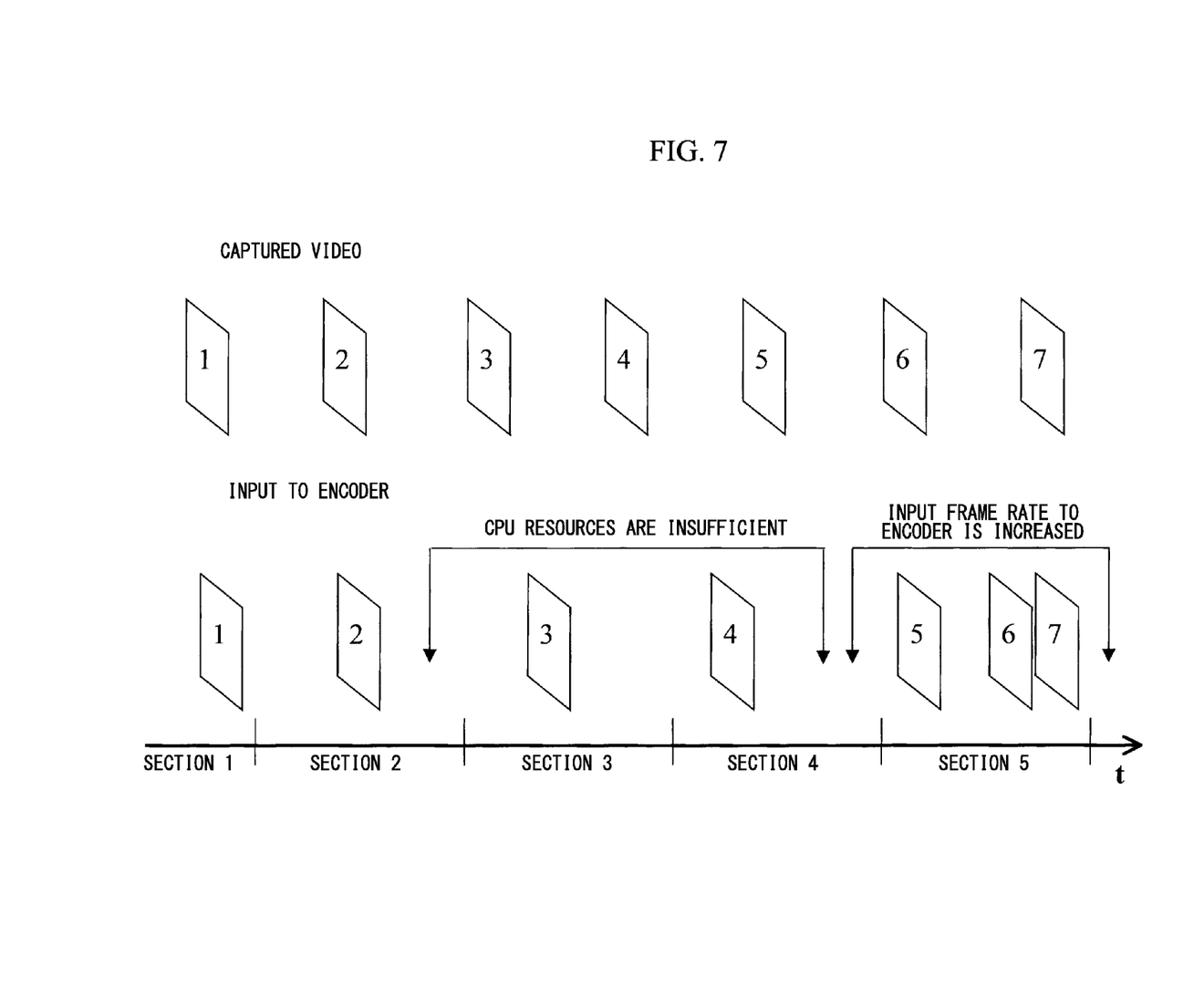
FIG. 7 is a diagram illustrating an example in which input timing of video fluctuates.

FIG. 7 illustrates an example in which input timing of video fluctuates. Although capturing by a camera is being executed at a fixed frame rate at regular timings, CPU resources become insufficient immediately after picture 2 is input and a process in a previous stage of the encoder is delayed, and thus picture 3 and subsequent pictures are delayed and sequentially input to the encoder. Thereafter, the lack of the resources of the CPU is resolved and the video accumulated in the previous stage of the encoder is input to the encoder one after another.

In an encoder in which a real-time process is assumed, if the number of pictures to be encoded per unit time is increased, a bit amount and the computational complexity are intermittently increased. As illustrated in FIG. 7, when a time domain is divided into sections each having a fixed time, while the number of pictures in sections 1 to 4 is one, the number of pictures in section 5 is 3, and the necessary bit amount and the necessary computational complexity are about three times compared to those in the other sections. Such fluctuation of the timing of the video input to the encoder causes a delay due to a capacity of a transmission path through which an encoded video stream is transmitted being exceeded as well as packet loss in the worst case, leading to the degradation of video quality at the reception end.

As in the technology disclosed in Patent Document 1, the number of dropped pictures representing the number of input video pictures from which one picture is dropped is calculated from a ratio between an input frame rate for the encoder and the frame rate at which the encoding is possible, and it is necessary for the input frame rate for the encoder to be known in advance when a dropping process is performed in accordance with the calculated number of dropped pictures.

Thus, the following problems arise even when the input frame rate for the encoder is measured. As in the example of FIG. 7, when the number of frames capable of being encoded by the encoder is 1 in one section, the number of frames to be input to the encoder is 1 in sections 1 to 4. In view of measurement results of sections 1 to 4, the number of frames to be input to the encoder is equal to the number of frames capable of being encoded, and thus it is not necessary to drop any frame. However, the number of frames to be input in section 5 is 3. If the input video of section 5 is not dropped in view of the measurement results of sections 1 to 4, video exceeding the number of frames capable of being encoded is input to the encoder.

An object of the present invention is to solve the above problems and to control the computational complexity and an information amount of an encoder within a given range even when the input timing of the input video is not constant and fluctuates.

Means for Solving the Problems

In order to solve the above problems, the present invention determines whether to drop an input video frame so that the number of video frames to be encoded is not instantaneously increased. The determination is made based on whether the number of frames input in the past within a unit time from the time when a determination target picture is input exceeds a predetermined threshold value, and the input frame rate for the encoder determined by the input timing of the input video is not used. If the above number of frames exceeds the threshold value, the frame is dropped; otherwise, encoding is performed.

An operation of the present invention is as follows. The input frame rate for the encoder is not used in a picture dropping determination. Thus, even when the input timing of the input video fluctuates and the frame rate is not constantly maintained, a satisfactory determination result can be obtained and appropriate picture dropping can be performed. Accordingly, even when the input timing of the input video fluctuates, it is possible to prevent the number of video frames to be encoded from being instantaneously increased by using a picture dropping process. That is, it is possible to suppress an instantaneous increase in the computational complexity of an encoder and an instantaneous increase in an information amount of a video bitstream.

In addition, a determination as to whether the number of pictures input in the past within a unit time from the time when a determination target picture is input exceeds a threshold value calculated from a set frame rate is made, i.e., a determination using only information that is already known when the target picture is input is made, and thus a delay does not occur.

It is to be noted that because the present technology does not use information during encoding, it can be configured independent of the encoder, and the conventional encoder can be used without modification.

Advantageous Effects of Invention

The present invention provides the following advantages even when the input timing of the input video is not constant and fluctuates.
(1) It is possible to suppress an instantaneous increase in the computational complexity of an encoder without increasing a delay.
(2) It is possible to suppress an instantaneous increase in an information amount of an encoded video bitstream without increasing a delay.

MODES FOR CARRYING OUT THE INVENTION

Hereinafter, examples and embodiments of the present invention will be described in detail using the drawings.

A frame rate $F_r$ capable of being input to an encoder and a reference frame rate measurement interval $T_i$ are set based on the throughput or the like of the encoder. Based on the reference frame rate measurement interval $T_i$, the number of video pictures n capable of being input within the measurement interval is calculated in advance in accordance with the following equation.

$$n = F_r \times T_i$$

First to $n^{th}$ input video pictures input immediately after encoding has started are not designated as a dropping target, and a dropping process is performed on future input video pictures after the $n^{th}$ picture.

Figure 1:
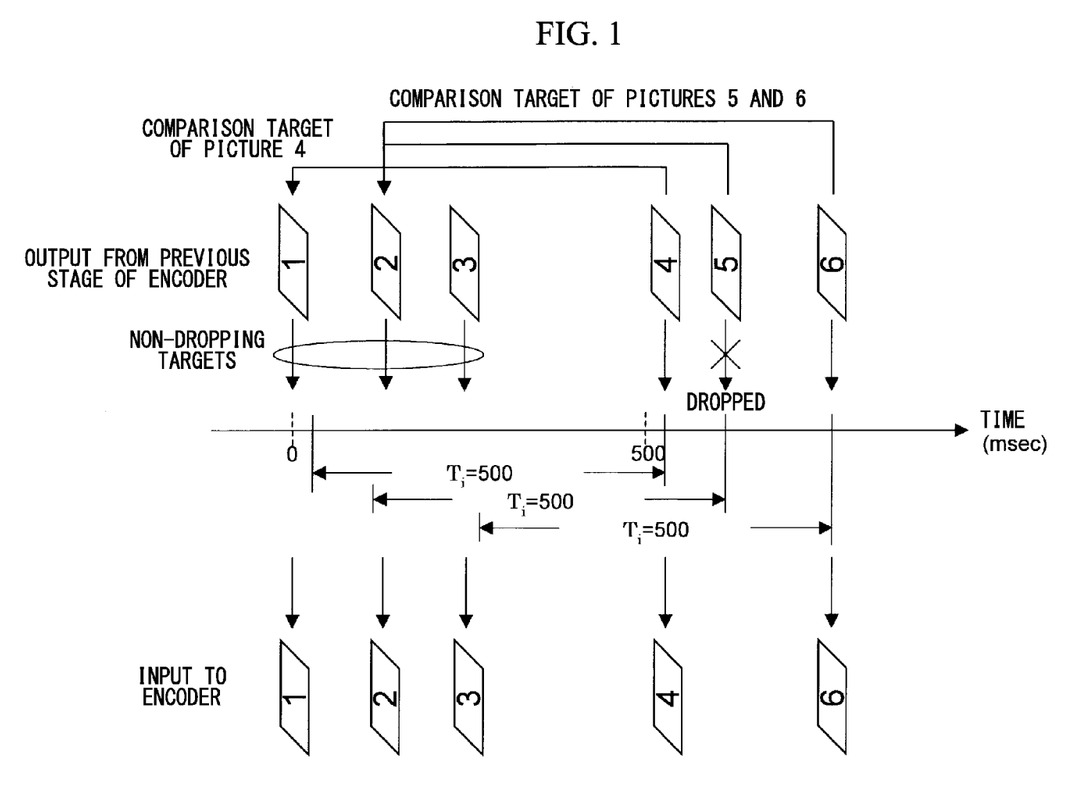
FIG. 1 is a diagram illustrating an example of a picture dropping process in accordance with an example of the present invention.

FIG. 1 illustrates an example of a picture dropping process in accordance with an example of the present invention. In the example of FIG. 1, the frame rate $F_r$ and the reference frame rate measurement interval $T_i$ are as follows.

$F_r$=0.006 (frames/millisecond (msec))

$T_i$=500 (msec)

The number of video pictures n capable of being input within the measurement interval $T_i$ is calculated as n=0.006× 500=3.

Hereinafter, a time when each picture is input in the present process, i.e., a time when each picture is output from the previous stage of the encoder such as a camera, is stamped as a time stamp of each picture and used in a determination. Because n=3, pictures 1 to 3 are designated as a non-dropping target and unconditionally input to the encoder. When picture 4 is input, if the time stamp of picture 1, which is a past frame by n (=3) frames, is past relative to the time before the time when picture 4 is input by $T_i$ (=500 msec), in other words, when the time stamp of picture 1 is designated as t1 and the time stamp of picture 4 is designated as t4, a determination as to whether the following equation is established is made and if the following equation is established, picture 4 is not dropped.

$(t4-t1)>T_i$

In the case of the example of FIG. 1, (t4−t1)>500 is established, which meets this condition. It is to be noted that this determination is equivalent to a determination as to whether the number of pictures input within a past period having the frame rate measurement interval $T_i$, which is a unit time, from the time stamp of picture 4 serving as a starting point exceeds the number of video pictures n capable of being input.

A similar comparison is performed between picture 5 and picture 2, and a determination as to whether picture 2 does not exist within past $T_i$ (=500 msec) is made. That is, the determination of the following equation is made.

$(t5-t2)>T_i$

In this example, picture 5 is dropped because (t5−t2)≤500 is established.

Next, a similar comparison is performed on picture 6, and a dropped picture is not counted when a picture of a comparison target is searched for. Because picture 5 has been dropped, the comparison target of picture 6 becomes picture 2. In this example, (t6−t2) is greater than 500 (msec). Thus, picture 6 is not dropped.

Figure 2:
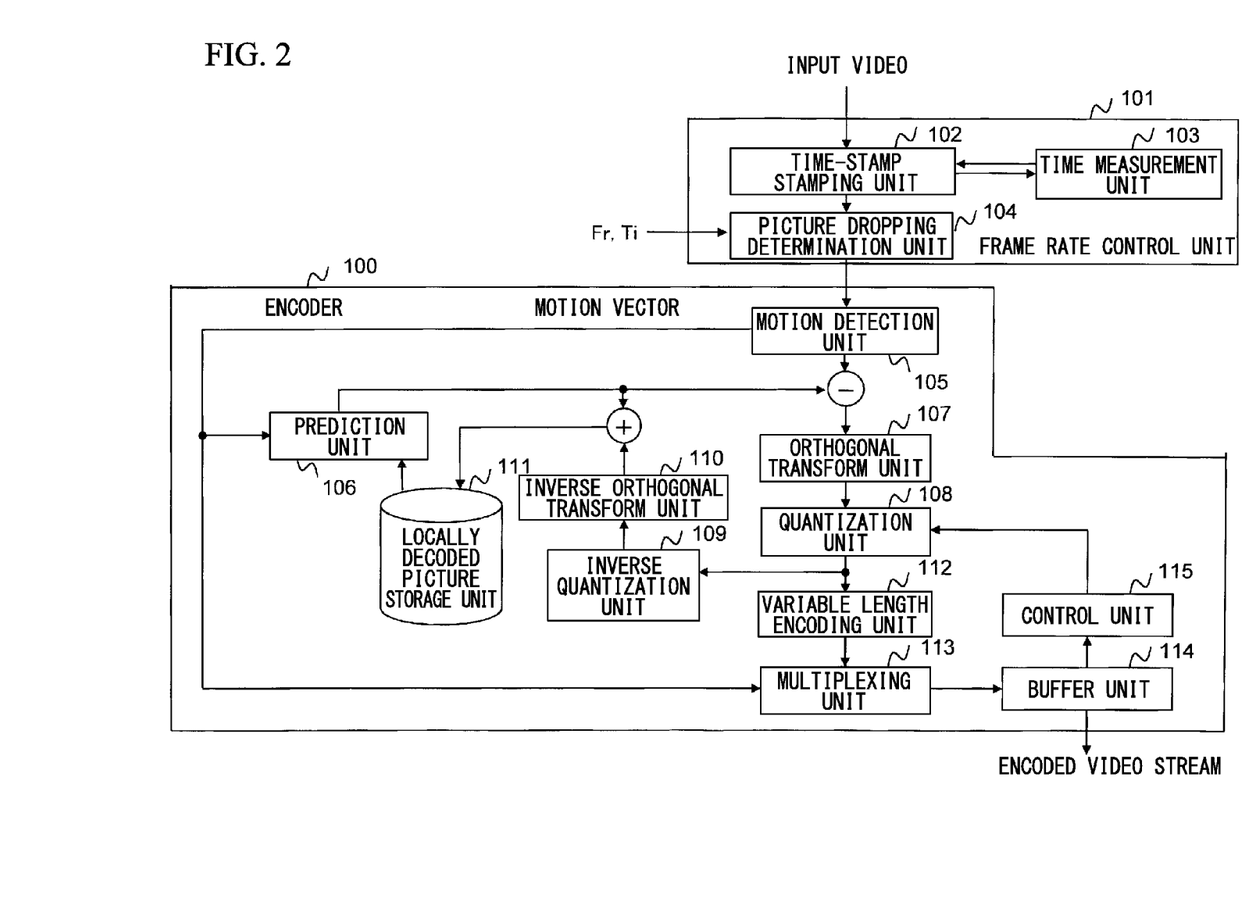
FIG. 2 is a block diagram illustrating a configuration of an apparatus in accordance with an embodiment of the present invention.
Figure 3:
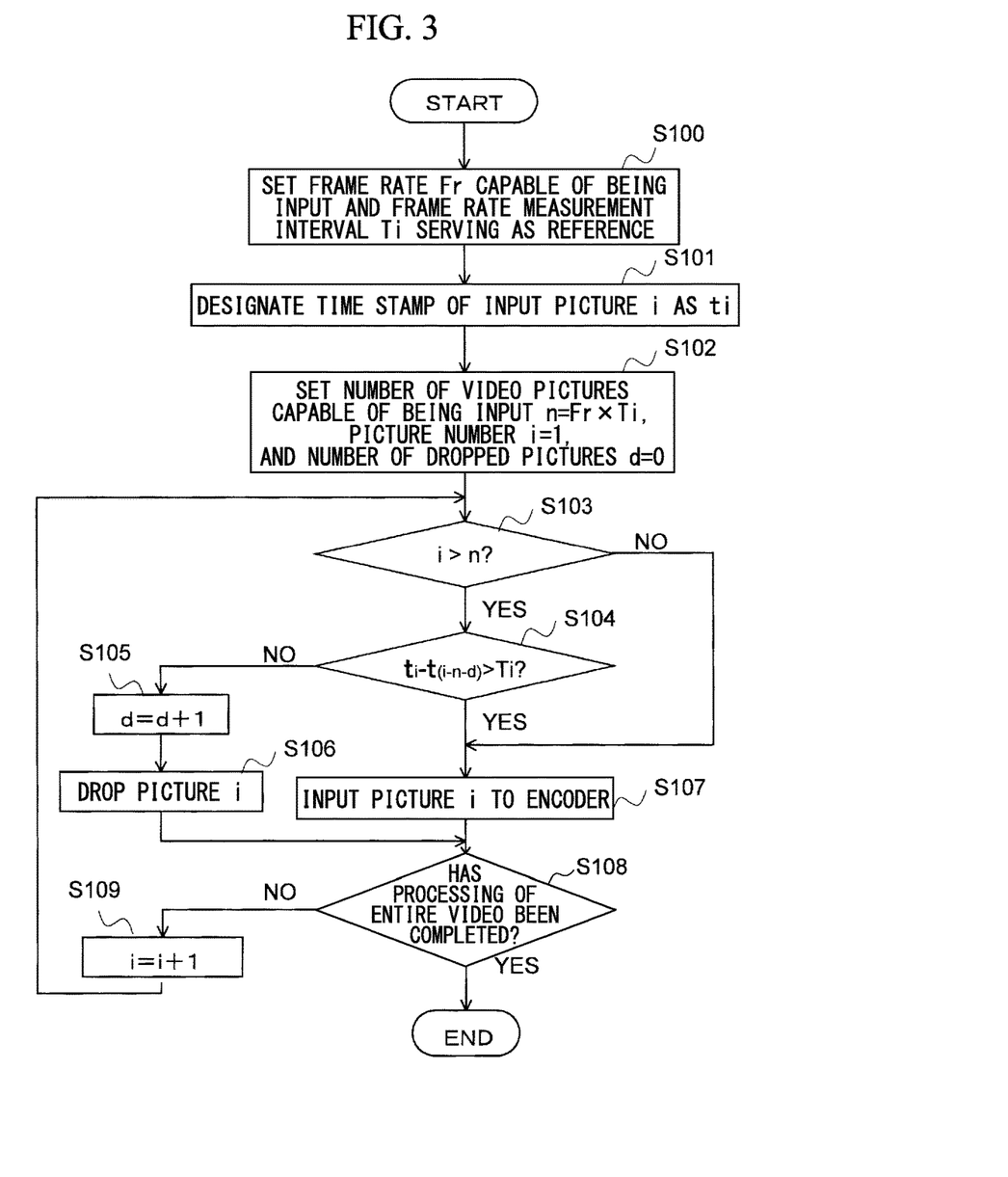
FIG. 3 is a flowchart of a picture dropping determination unit in accordance with an embodiment of the present invention.

FIG. 2 is a block diagram illustrating a configuration of an apparatus in accordance with an embodiment of the present invention. FIG. 3 is a flowchart of a picture dropping determination unit in accordance with an embodiment of the present invention.

In FIG. 2, an encoder 100 is, for example, an apparatus which encodes input video in accordance with an encoding scheme such as H.264 and outputs an encoded video stream. A frame rate control unit 101 adjusts a frame rate of input video for the encoder 100 so as to match a frame rate at which the encoder 100 is capable of encoding by means of dropping of a picture. It is to be noted that the frame rate control unit 101 may be embedded in the encoder 100. The encoding scheme of the encoder 100 is not limited to H.264 and it may be another encoding scheme such as Moving Picture Experts Group (MPEG)-2.

A frame of input video is first input to the frame rate control unit 101. A time-stamp stamping unit 102 stamps a time stamp $t_i$ on the input frame in accordance with a time measured by a time measurement unit 103. A picture dropping determination unit 104 determines whether to drop a picture of the input frame from the frame rate $F_r$ at which encoding by the encoder 100 is possible and the reference frame rate measurement interval $T_i$, drops the picture of the input frame, if necessary, and inputs its result to the encoder 100.

A frame input to the encoder 100 is divided into blocks, and a motion detection unit 105 performs motion detection. A prediction unit 106 performs prediction using a motion vector detected by a motion detection unit 105. An orthogonal transform unit 107 performs an orthogonal transform on a residual signal between an input signal and a predicted signal in accordance with a DCT or the like. A quantization unit 108 quantizes transform coefficients obtained by the orthogonal transform and outputs the result to an inverse quantization unit 109 and a variable length encoding unit 112. The inverse quantization unit 109 performs inverse quantization on the quantized result. An inverse orthogonal transform unit 110 performs an inverse orthogonal transform on transform coefficients obtained by the inverse quantization. A locally decoded picture storage unit 111 stores a locally decoded picture obtained by adding a decoded residual signal, which is an output of the inverse orthogonal transform unit 110, to the predicted signal, which is an output of the prediction unit 106. This locally decoded picture is used as a reference picture in subsequent predictive encoding.

The variable length encoding unit 112 performs variable length encoding on the output of the quantization unit 108. A multiplexing unit 113 multiplexes an output of the variable length encoding unit 112 and encoding information such as a motion vector, and outputs to a buffer unit 114. Data stored in the buffer unit 114 is output as an encoded video stream. A control unit 115 performs encoding control on the quantization unit 108 and the other units in accordance with a generated bit amount or the like. A configuration and operation of the above encoder 100 are similar to those of the conventional encoder 200 described with reference to FIG. 5. The frame rate control unit 101, which performs dropping adjustment of an input frame for the encoder 100, is different from the conventional technology.

A flow of the process of the picture dropping determination unit 104 in accordance with the present embodiment will be described in accordance with FIG. 3.

The picture dropping determination unit 104 first sets the frame rate $F_r$ (frame rate capable of being input) at which encoding by the encoder 100 is possible and the frame rate measurement interval $T_i$ serving as a reference (step S100), and a time stamp of an input picture i is designated as $t_i$ (step S101). Next, the number of video pictures n capable of being input is calculated from n=$F_r$×$T_i$, the picture number i is set to 1, and the number of dropped pictures d is set to 0 (step S102). Thereafter, the following process is iterated for every picture.

Because a picture dropping process is not performed if the picture number i is less than or equal to the number of video pictures n capable of being input, the picture is input to the encoder 100 (steps S103 and S107). If the picture number i becomes greater than the number of video pictures n capable of being input, a determination as to whether the difference between the time stamp $t_i$ of the determination target picture i and a time stamp $t_{(i-n-d)}$ of a past picture by (n+d), which is determined by the number of video pictures n capable of being input and the number of dropped pictures d, exceeds the frame rate measurement interval $T_i$ serving as the reference is made (step S104). This determination method is equivalent to a determination as to whether the number of pictures input within a past period having the frame rate measurement interval $T_i$, which is a unit time, from the time stamp $t_i$ of the picture (picture i) having the picture number i serving as a starting point by exceeds the number of video pictures n capable of being input.

If the difference between the time stamps $t_i - t_{(i-n-d)}$ is less than or equal to the frame rate measurement interval $T_i$, 1 is added to the number of dropped pictures d (step S105) and then the picture i is dropped and discarded (step S106). In contrast, if the difference between the time stamps $t_i - t_{(i-n-d)}$ is greater than the frame rate measurement interval $T_i$, the encoder 100 can encode the picture I, and thus the picture i is input to the encoder 100.

Until processing of the entire video is completed (step S108), the above steps S103 to S109 are iterated while 1 is added to i (step S109).

The frame rate control and the encoding process by the encoder described above can also be implemented by a computer and a software program, and the program can also be recorded on a computer-readable recording medium and provided through a network.

Figure 4:
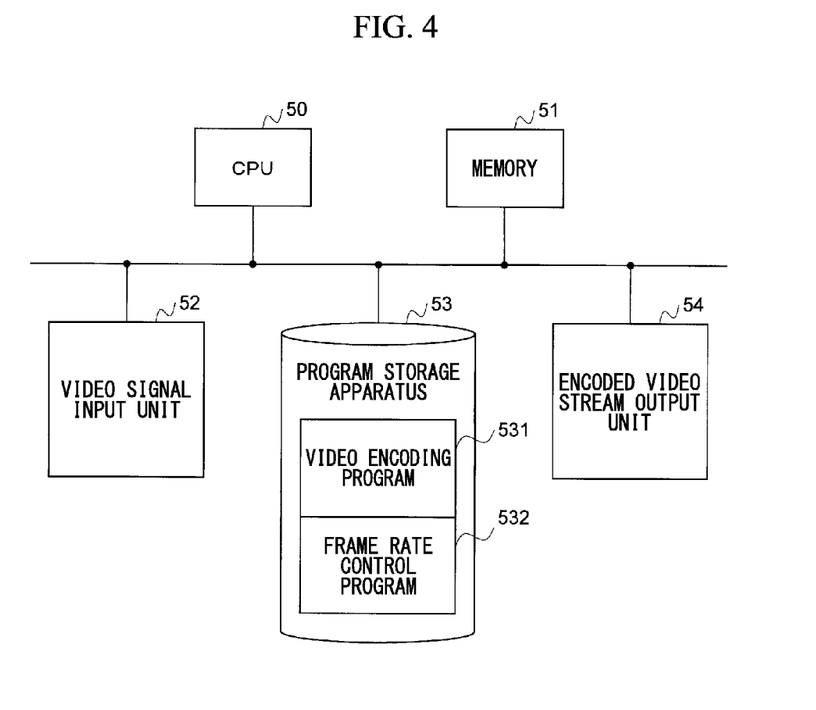
FIG. 4 is a diagram illustrating an example of a configuration of a system when the apparatus of the present embodiment is implemented using a computer and a software program.

FIG. 4 illustrates an example of a configuration of hardware when the apparatus illustrated in FIG. 2 is configured by a computer and a software program. The present system has a configuration in which a CPU 50 which execute the program, a memory 51 such as a random access memory (RAM) which stores the program and data to be accessed by the CPU 50, a video signal input unit 52 (which may be a storage unit which stores a video signal by a disk apparatus or the like) which inputs an encoding target video signal from a camera or the like, a program storage apparatus 53 which stores a video encoding program 531 and a frame rate control program 532, and an encoded video stream output unit 54 (which may be a storage unit which stores an encoded video stream by a disk apparatus or the like) are connected by a bus.

The CPU 50 encodes an input video signal input by the video signal input unit 52 by executing the video encoding program 531 and the frame rate control program 532 loaded from the program storage apparatus 53 to the memory 51, and outputs an encoded video stream of an encoding result to a network or the like via the encoded video stream output unit 54. The video encoding program 531 is a program which realizes the function of the encoder 100 of FIG. 2, and the frame rate control program 532 is a program which realizes the function of the frame rate control unit 101 of FIG. 2. It is to be noted that the frame rate control program 532 may be embedded in the video encoding program 531 as part of the video encoding program 531.

While examples and embodiments of the present invention have been described above with reference to the drawings, it is apparent that the examples and the embodiments are mere illustrations of the present invention and that the present invention is not limited to the examples and embodiments described above. Therefore, additions, omissions, substitutions, and other modifications of structural elements can be made without departing from the spirit or scope of the present invention.

INDUSTRIAL APPLICABILITY

The present invention is applicable to, for example, encoding of video. In accordance with the present invention, it is possible to suppress an instantaneous increase in the computational complexity of an encoder and an information amount of an encoded video bitstream without increasing a delay even when input timing of input video fluctuates.

DESCRIPTION OF REFERENCE SIGNS

100 Encoder
101 Frame rate control unit
102 Time-stamp stamping unit
103 Time measurement unit
104 Picture dropping determination unit
105 Motion detection unit
106 Prediction unit
107 Orthogonal transform unit
108 Quantization unit
109 Inverse quantization unit
110 Inverse orthogonal transform unit
111 Locally decoded picture storage unit
112 Variable length encoding unit
113 Multiplexing unit
114 Buffer unit
115 Control unit

The invention claimed is:

1. A frame rate control method for adjusting a frame rate of input video to a frame rate at which an encoder is able to perform encoding, the frame rate control method comprising:
a step of setting a frame rate measurement interval $T_i$ which serves as a reference;
a step of determining whether the number of pictures input in the past within a predetermined time from a time when a determination target picture of dropping is input exceeds a predetermined threshold value, a determination as to whether the number of the input pictures exceeds the predetermined threshold value being made by determining whether the difference between a time stamp $t_i$ of the determination target picture and a time stamp $t_{(i-n-d)}$ of a past picture by (n+d) which is determined by the number of pictures n capable of being input to the encoder within the frame rate measurement interval $T_i$ which is the predetermined time and the number of dropped pictures d, exceeds the frame rate measurement interval $T_i$; and
a step of discarding the determination target picture if the determination target picture is not any one of first to $n^{th}$ input video pictures and the difference is less than or equal to the frame rate measurement interval $T_i$ and designating the determination target picture as an encoding target if the determination target picture is any one of the first to $n^{th}$ input video pictures or the difference is greater than the frame rate measurement interval $T_i$.

2. A frame rate control apparatus which adjusts a frame rate of input video to a frame rate at which an encoder is able to perform encoding, the frame rate control apparatus comprising:
a setting unit which sets a frame rate measurement interval $T_i$ which serves as a reference;
a determination unit which determines whether the number of pictures input in the past within a predetermined time from a time when a determination target picture of dropping is input exceeds a predetermined threshold value, a determination as to whether the number of the input pictures exceeds the predetermined threshold value being made by determining whether the difference between a time stamp $t_i$ of the determination target picture and a time stamp $t_{(i-n-d)}$ of a past picture by (n+d) which is determined by the number of pictures n capable of being input to the encoder within the frame rate measurement interval $T_i$ which is the predetermined time and the number of dropped pictures d, exceeds the frame rate measurement interval $T_i$; and a dropping unit which discards the determination target picture if the determination target picture is not any one of first to $n^{th}$ input video pictures and the difference is less than or equal to the frame rate measurement interval $T_i$ and designates the determination target picture as an encoding target if the determination target picture is any one of the first to $n^{th}$ input video pictures or the difference is greater than the frame rate measurement interval $T_i$.

3. A non-transitory computer readable medium storing a frame rate control program for causing a computer to execute the frame rate control method according to claim 1.

* * * * *